United States Patent
Lin

(10) Patent No.: US 7,535,142 B2
(45) Date of Patent: May 19, 2009

(54) ENHANCED THERMAL DEFORMATION RESISTING BEARING OF ELECTRIC MOTOR

(75) Inventor: Chun-Ju Lin, Taipei County (TW)

(73) Assignee: Tek-Chain Technology Co., Ltd. (TW)

( * ) Notice: Subject to any disclaimer, the term of this patent is extended or adjusted under 35 U.S.C. 154(b) by 310 days.

(21) Appl. No.: 11/713,648

(22) Filed: Mar. 5, 2007

(65) Prior Publication Data

US 2008/0218017 A1 Sep. 11, 2008

(51) Int. Cl.
*H02K 5/16* (2006.01)
*F16C 33/02* (2006.01)

(52) U.S. Cl. .......................................... 310/90; 384/276
(58) Field of Classification Search .................... 310/90; 417/423.13; 384/276
See application file for complete search history.

(56) References Cited

U.S. PATENT DOCUMENTS

2003/0147571 A1 * 8/2003 Chen .......................... 384/276

* cited by examiner

*Primary Examiner*—Scott B. Geyer
*Assistant Examiner*—Terrance Kenerly
(74) *Attorney, Agent, or Firm*—Bacon & Thomas, PLLC

(57) ABSTRACT

This invention discloses an enhanced thermal deformation resisting bearing of an electric motor. The bearing includes a frame for containing a stator and a rotor. The stator has an axle sleeve sheathed with a bearing. The bearing has a hole groove for dividing the bearing into inner and outer layers. A connecting portion maintains an appropriate interval between the inner and outer layers. An embedded groove is extended inward and disposed at a free end of the axle sleeve. The rotor has an axle, and the periphery of the axle has a groove. The groove corresponds with the connecting portion of the bearing. The rotor has a protruding latch disposed proximate to the axle and embedded into the embedded groove. If the axle rotates in the bearing, the thinner inner layer will be expanded by high temperature, but the thicker connecting portion still maintains the bearing in its position.

12 Claims, 7 Drawing Sheets

ENHANCED THERMAL DEFORMATION RESISTING BEARING OF ELECTRIC MOTOR

BACKGROUND OF THE INVENTION

1. Field of the Invention

The present invention relates to an enhanced thermal deformation resisting bearing of an electric motor, and more particularly to a bearing having a connecting portion and an axle groove for maintaining the shape of the bearing and preventing a shift of an axle and an adverse effect on the operation of the axle due to expansions and deformation caused by the high temperature produced by the rotation, so as to achieve the effects of reducing noises and enhancing the life expectancy and efficiency of the electric motor.

2. Description of the Related Art

Referring to FIG. 1 for a heat dissipating fan of a computer in accordance with a prior art, the heat dissipating fan comprises a stator 100 and a rotor 200. The stator 100 is comprised of a stator 100 disposed at the central position of the stator 100, a hollow circular bearing 101 disposed in the stator 100, and a magnetic pole 102. The rotor 200 is comprised of an axle 201, a permanent magnet 202 disposed around the internal periphery of the rotor 200, a latch ring 203 disposed at a free end of the axle 201 and a vane 204. The axle 201 is pivotally coupled into the bearing 101 of the stator 100, such that when the rotor 200 is rotated to drive and rotate the axle 201 in the bearing 101. Although the vane 204 of the rotor 200 produces turbulences during its rotation, air currents also drive the rotor 200 to produce a dragging reaction along an axial direction. The latch ring 203 is latched at the internal side of the bearing 101 for engaging the stator 100 with the rotor 200. Since both axle 201 and bearing 101 are made of a hard metal material, therefore the axle 201 and bearing 101 can be expanded due to high temperature produced after a long time of use, and the gap between the axle 201 and bearing 101 becomes smaller and the axle 201 and bearing 101 are in touch with each other to produce frictions. As a result, the axle 201 and bearing 101 are worn out easily after a continuous use, and the axle 201 may be shifted to cause an unstable condition and increase the noise volume.

To overcome the foregoing shortcomings of creating frictions, noises and worn-out, the bearing 101 as shown in FIG. 2 is made of a hard plastic material, and an inwardly tapered opening 103 is disposed at a distal end of a free end of the bearing 101, and a concave latch groove 2011 disposed at an appropriate position of the axle 201, and the latch groove 2011 is latched with the corresponding tapered opening 103 of the bearing 101 to engage the stator 100 and the rotor 200. Since the bearing 101 is made of a plastic material, therefore the problems of an internal diameter error and a rough edge may arise during the manufacturing process of the bearing 101, such as a too-large/too-small internal diameter or a shifted axle. If the internal diameter is too small, then high temperature will be produced by continuous rotations of the axle 201. Since the bearing 101 and the axle 201 have different coefficients of thermal expansion, the bearing 101 will be wrapped tightly around the axle 201, and the unstable condition will result in wearing out the axle 201 and the bearing 101 and producing a loud noise. Since the tapered opening 103 is expanded outward by high temperature, the opening 103 cannot be latched onto the latch groove 2011 anymore.

In view of the shortcomings of the prior art, the inventor of the present invention based on years of experience in the related industry to conduct extensive researches and experiments, and finally developed an enhanced thermal deformation resisting bearing of an electric motor in accordance with the present invention.

SUMMARY OF THE INVENTION

Therefore, it is a primary objective of the present invention to provide an enhanced thermal deformation resisting bearing of an electric motor, and the bearing is disposed around a hollow hole groove in the bearing for dividing the bearing into inner and outer layers. A connecting portion is coupled between the inner and outer layers for maintaining an appropriate interval between the inner and outer layers, such that the bearing will not be deformed or the axle will not be shifted due to the high temperature produced after continuous rotations of the axle.

Another objective of the present invention is to provide an elasticity for an outer layer of the bearing by maintaining an interval between the inner and outer layers of the bearing, so that the axle sleeve can be secured with the bearing when the axle sleeve wraps around the outer layer of the bearing tightly.

A further objective of the present invention is to maintain an interval between the inner and outer layers of the bearing for insulating the high-temperature heat produced by the rotation of the axle and preventing the high-temperature heat from being conducted to the axle sleeve, and thus the axle sleeve will not be expanded or deformed due to the high-temperature heat.

Another further objective of the present invention is to build a groove at the periphery of the axle and corresponding to the connecting portion of the bearing for maintaining the smallest gap between the bearing and the axle after the axle is rotated.

Another objective of the present invention is to fill lubricant oil into a space between the groove of the axle and the connecting portion of the bearing for improving the lubricating effect for the axle.

Another objective of the present invention is to create an embedded groove extended inward and disposed at an internal side of the opening at the free end of the axle sleeve, and the embedded groove is latched to the latch member of the rotor, such that the embedded groove and the latch together facilitate the installation of the electric motor and secure the rotor and the stator with each other.

DETAILED DESCRIPTION OF THE PREFERRED EMBODIMENTS

To make it easier for our examiner to understand the technical characteristics of the invention, we use preferred embodiments together with the attached drawings for the detailed description of the invention.

Figure 1:
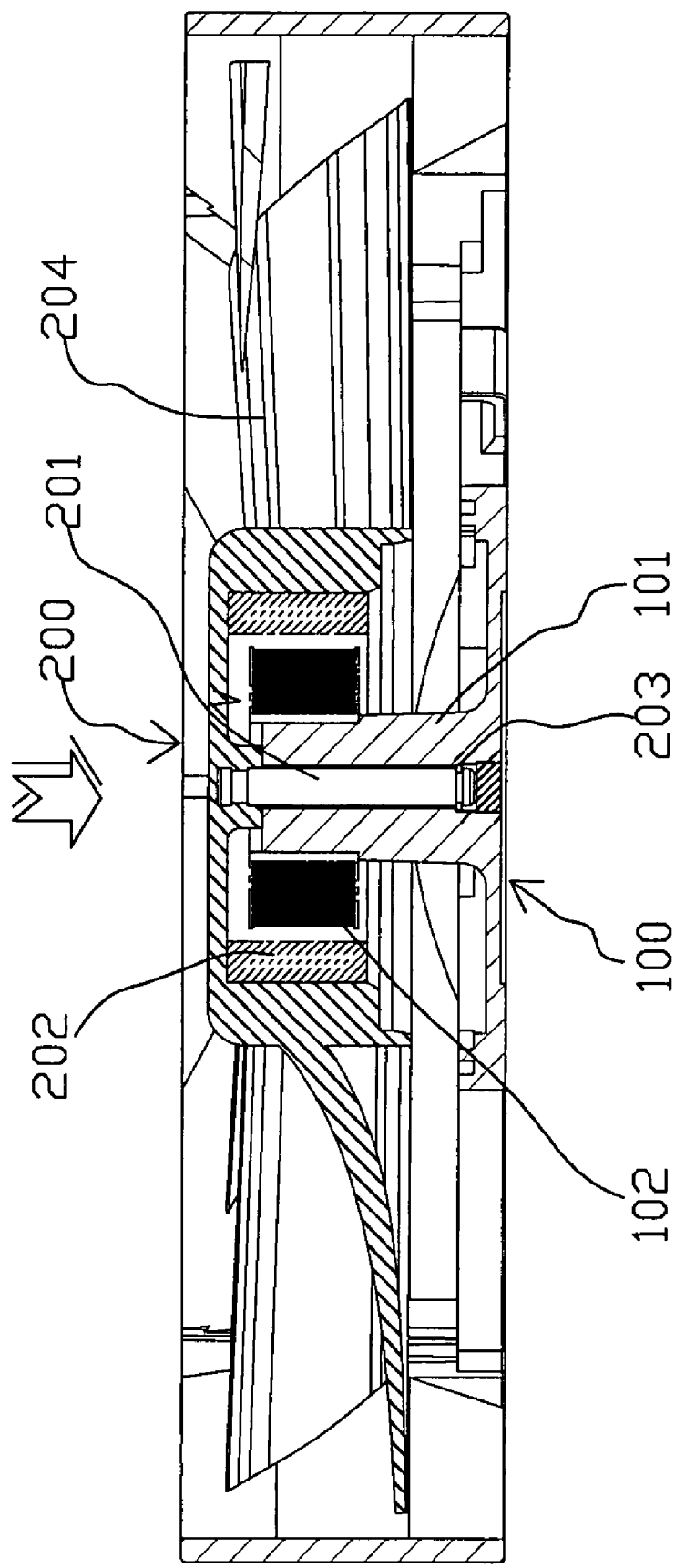
FIG. 1 is a schematic view of a prior art.
Figure 2:
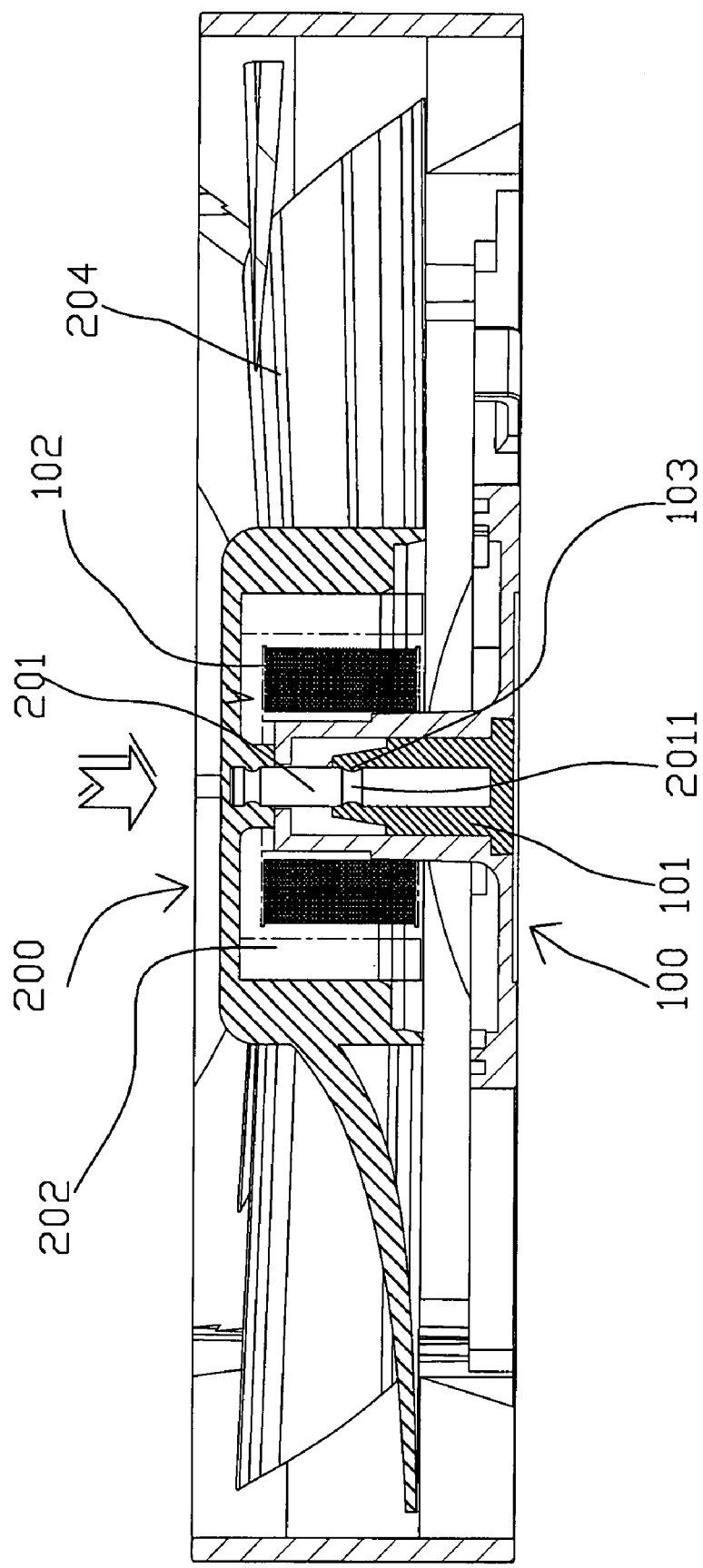
FIG. 2 is another schematic view of a prior art.
Figure 3:
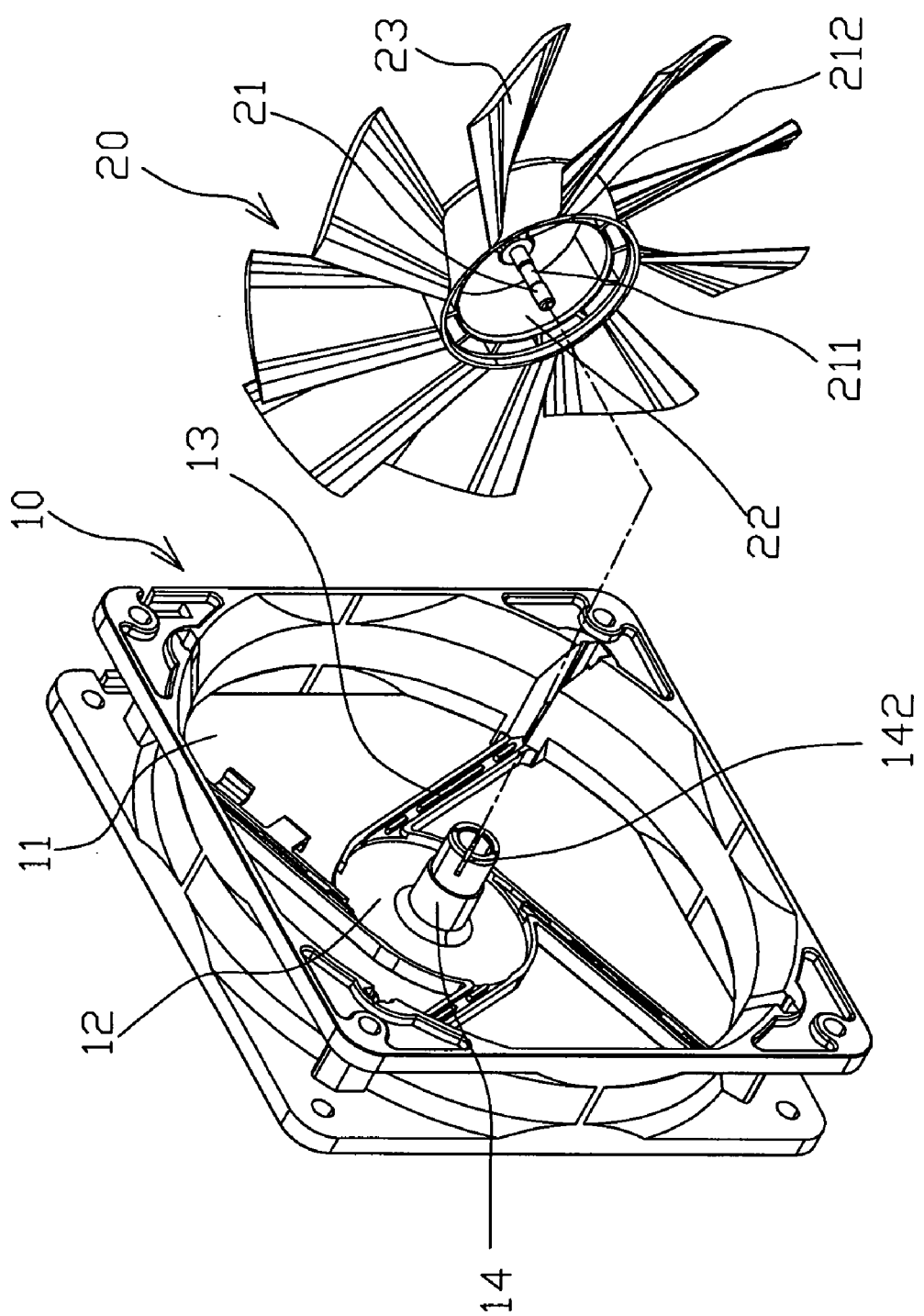
FIG. 3 is a perspective view of the present invention.
Figure 4:
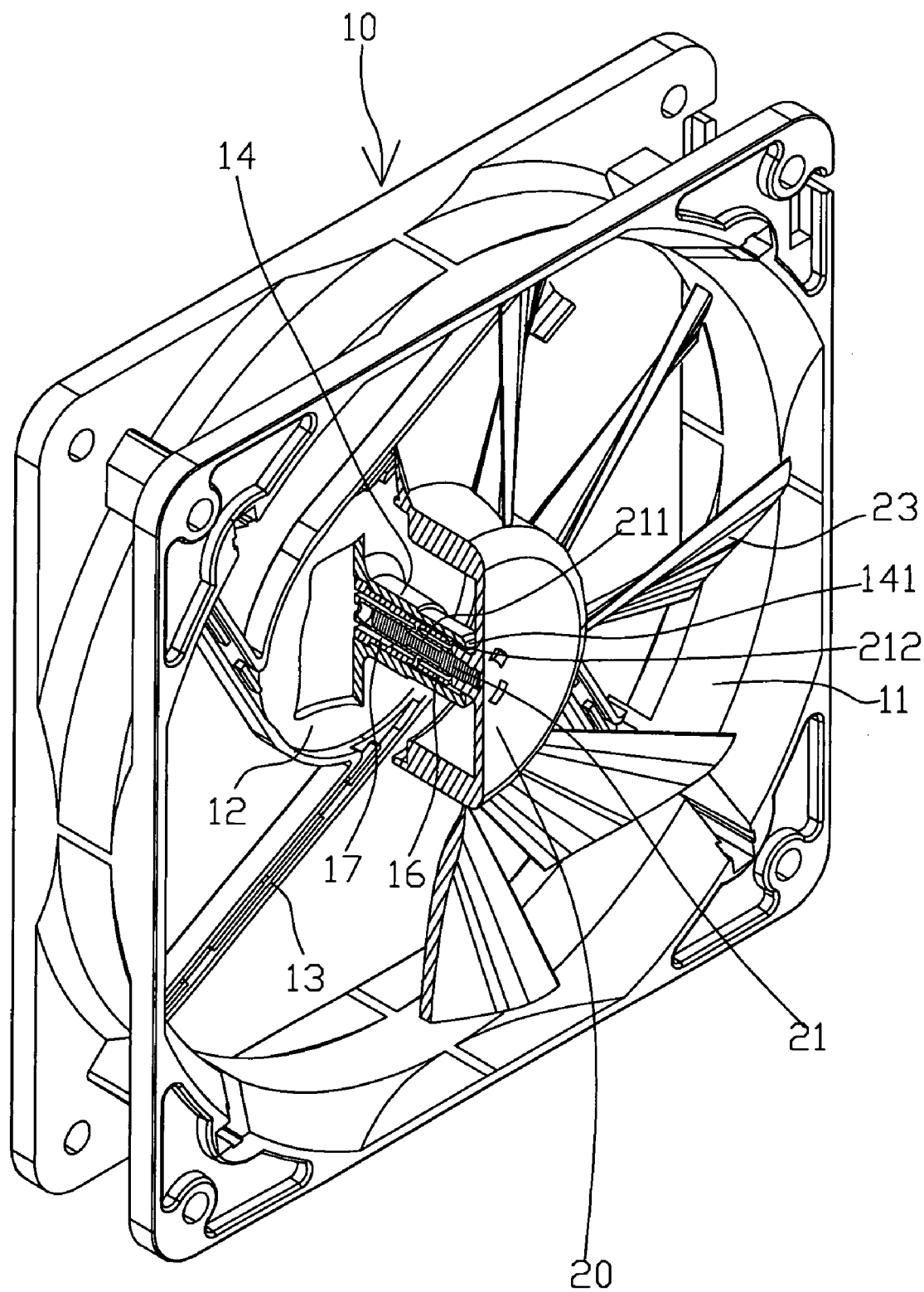
FIG. 4 is a perspective view of an assembly of the present invention.
Figure 4A:
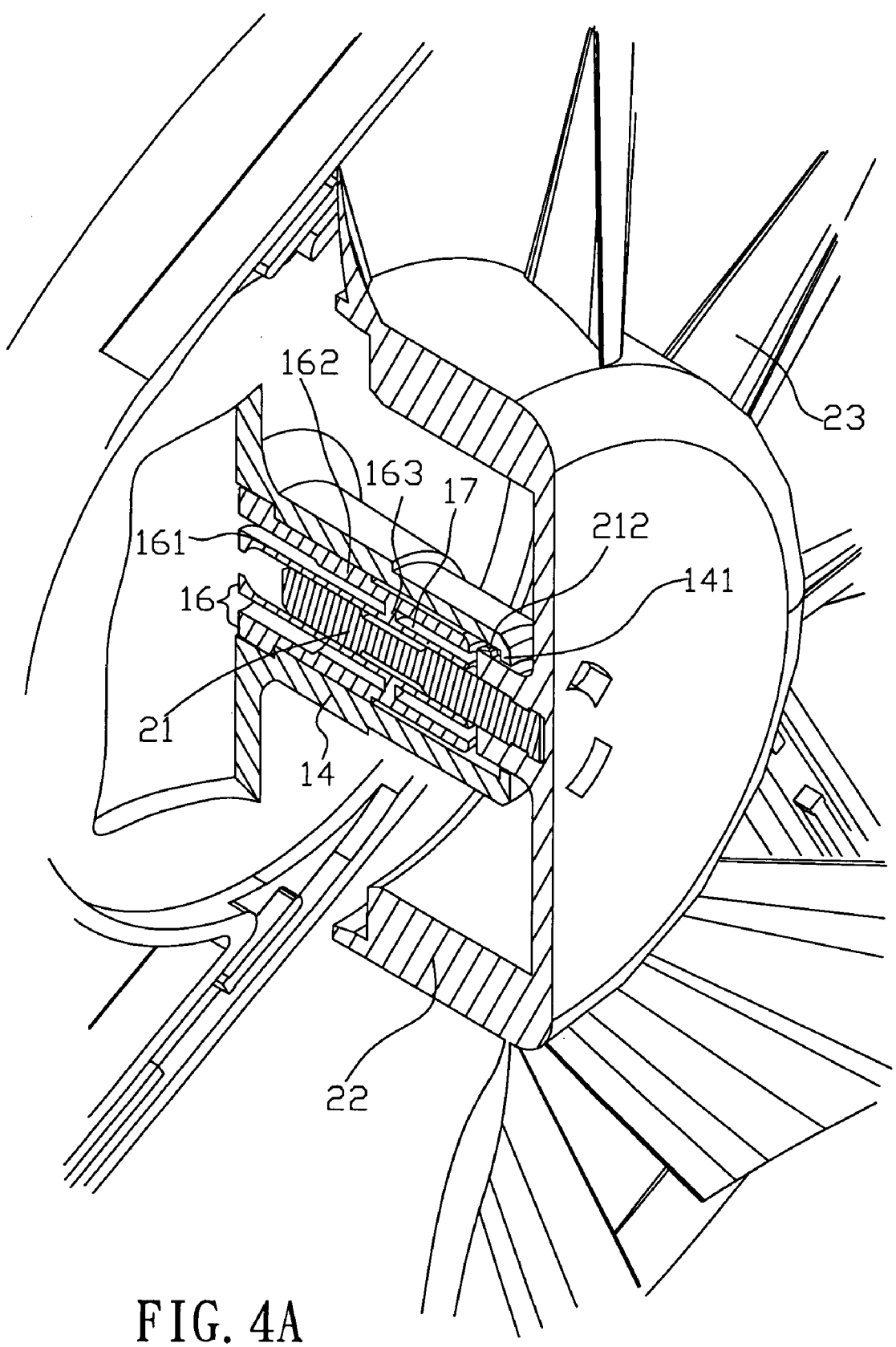
FIG. 4A is an enlarged view of a portion of FIG. 4.
Figure 5:
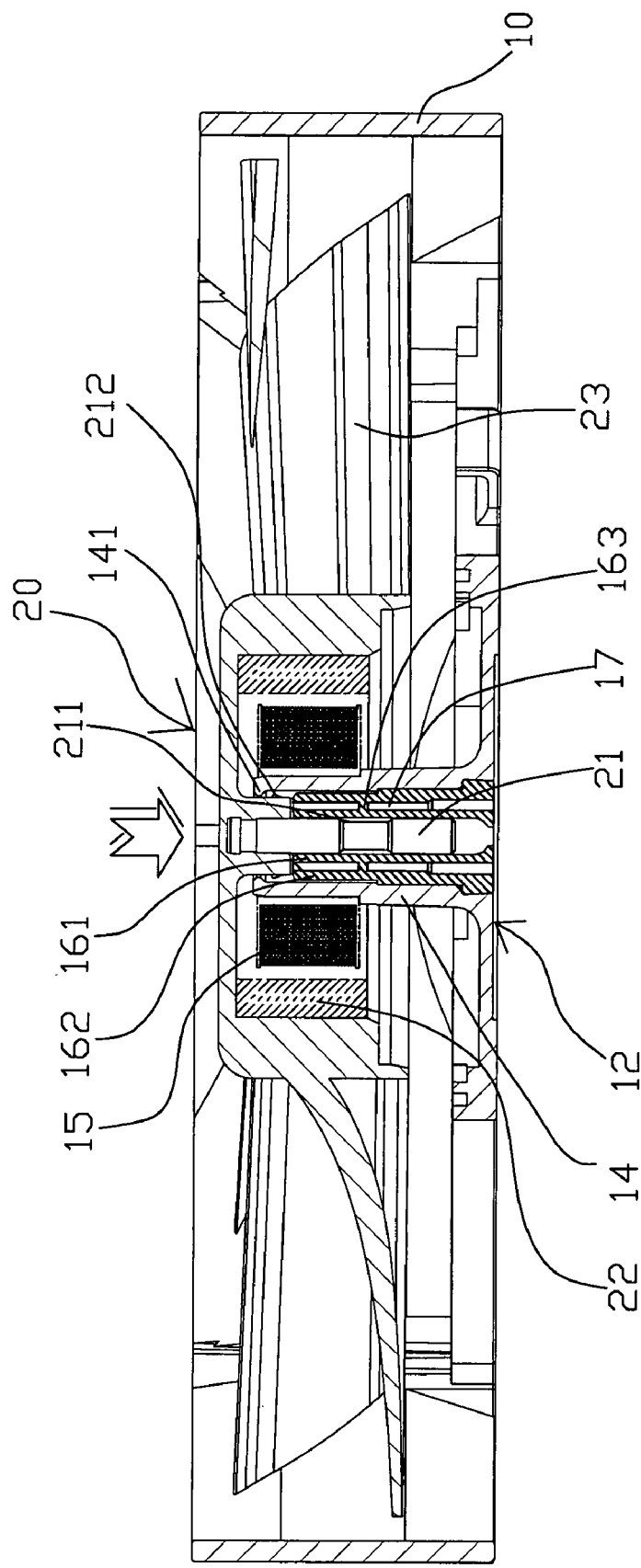
FIG. 5 is a cross-sectional view of FIG. 4.

Referring to FIGS. 3, 4, 4A and 5 for a preferred embodiment of the present invention, the bearing comprises a frame 10, and an opening 11 penetrating the frame 10, a stator 12 installed at the middle of the surface of the opening 11a and the periphery of the stator 12 being connected to the frame 10 by a rib 13. The stator 12 further has an axle sleeve 14 and a magnetic pole 15 disposed around the periphery of the axle sleeve 14 (as shown in FIG. 5), and the axle sleeve 14 is perpendicular to the stator 12, and the axle sleeve 14 中has a hollow circular bearing 16 (wherein the axle sleeve and the bearing of this embodiment are made of a hard plastic material), and the bearing 16 has a hollow hole groove 17 disposed around the hollow hole groove 17 for dividing the bearing into inner and outer layers 161, 162, and a connecting portion 163 is connected between the inner and outer layers 161, 162 for maintaining an appropriate interval between the inner and outer layers 161, 162. An embedded groove 141 is extended inward and disposed at an internal side of a distal end of a free end of the axle sleeve 14, and the embedded groove 141 has a slot 142 disposed along an axial direction (as shown in FIG. 3), such that the slot 142 provides an elastic effect of expanding and contracting the embedded groove 141.

Further, the frame 10 has a rotor 20 corresponding to the stator 12, and the rotor 20 is comprised of an axle 21 disposed at the center of an internal periphery of the rotor 20, a permanent magnet 22 disposed around an internal periphery of the rotor 20 and a plurality of vanes 23 disposed axially around the external periphery of the rotor 20 and arranged with a gap between each other. A groove 211 is disposed at the periphery of the axle 21 and corresponding to the connecting portion 163 of the bearing 16, and a protruding latch 212 is disposed on the rotor 20 and proximate to the axle 21, and the groove 211 and the latch 212 are engage with each other by the expansion and contraction of the embedded groove 141 (as shown in FIG. 4).

Referring to 4, 4A and 5 for an application, the axle 21 is sheathed in to the bearing 16, and the latch 212 is embedded into the embedded groove 141, and the stator 12 and rotor 20 are combined with each other. The electromagnetic effect of the magnetic pole 15 of the stator 12 and the permanent magnet 22 of the rotor 20 drives and rotates the rotor 20. When the rotor 20 is rotated, the axle 21 is rotated in the bearing 16 accordingly, so that when the axle 21 continues rotating to produce a high temperature, the inner layer 161 will be deformed and expanded outward due to the high temperature. Since the connecting portion 163 comes with a larger thickness, and lubricant oil is filled into the space between the groove 211 of the axle 21 and the connecting portion 163 of the bearing 16 to improve the lubricating effect, therefore the bearing 16 will not be deformed or the axle 21 will not be shifted due of a high temperature produced after continuous rotations of the axle 21. The invention can provide smooth and stable operations of the axle 21, reduce noises, and enhance the life expectancy and efficiency of a fan.

Since the interval between the inner and outer layers 161, 162 of the bearing 16 provides elasticity for the outer layer 162 of the bearing 16, therefore the axle sleeve 14 can be combined with the bearing 16 securely when the axle sleeve 14 can be wrapped closely around the outer layer 162 of the bearing 16. Similarly, the interval between the inner and outer layers 161, 162 of the bearing 16 can insulate the high temperature and prevent heat from being conducted to the axle sleeve 14 when a high temperature is produced by the rotation of the axle 21, so as to prevent the axle sleeve 14 from being expanded or deformed due to high temperature.

Figure 6:
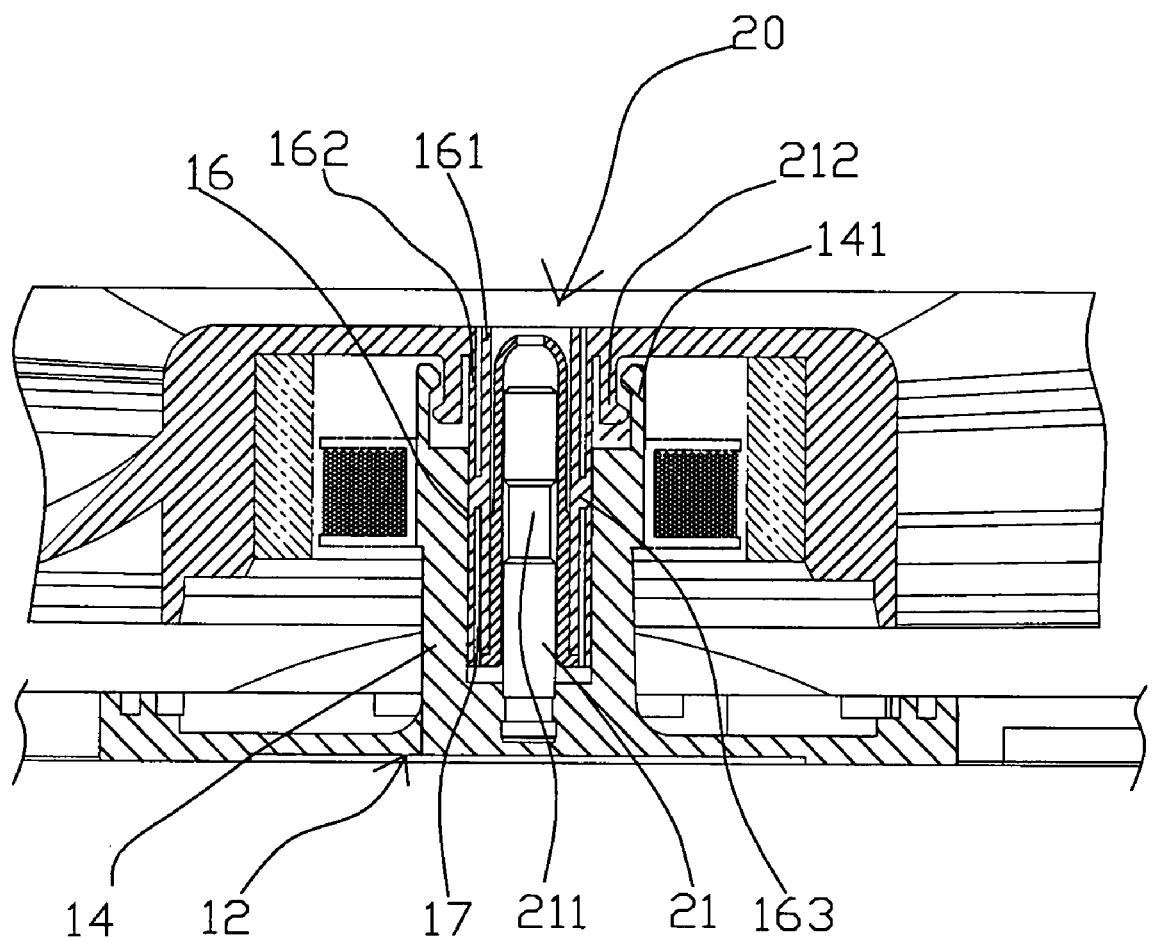
FIG. 6 is a cross-sectional view of another preferred embodiment of the present invention.

Referring to FIG. 6 for another preferred embodiment of the present invention, the major difference between this embodiment and the foregoing embodiment reside on that the axle 21 is fixed into the axle sleeve 14 of the stator 12, and an embedded groove 141 is extended inward and disposed at an internal side of a distal end of a free end of the axle sleeve 14, and the embedded groove 141 has a slot 142 (not shown in the figure) disposed along an axial direction for providing an elasticity of expanding and contracting the embedded groove 141. The rotor 20 further includes a hollow bearing 16 disposed at the central position of the rotor 20, and the bearing 16 is sheathed onto the axle 21 of the axle sleeve 14. The bearing 16 has a hollow hole groove 17 disposed around the bearing 16 for dividing the bearing into inner and outer layers 161, 162, and a connecting portion 163 is connected between the inner and outer layers 161, 162 for maintaining an appropriate interval between the inner and outer layers 161, 162. Further, the internal side of the rotor 20 has a protruding latch 212, and the latch 212 can be embedded precisely into the embedded groove 141 by the expansion and contraction of the embedded groove 141.

In summation of the above description, the design of the invention can enhance the durability of the electric motor and reduce the operating noise than the conventional structure and further complies with the patent application requirements and is duly filed for a patent application.

While the invention has been described by means of specific embodiments, numerous modifications and variations could be made thereto by those skilled in the art without departing from the scope and spirit of the invention set forth in the claims.

What is claimed is:

1. An enhanced thermal deformation resisting bearing of an electric motor, and said electric motor being comprised of a frame, a stator and a rotor installed in said frame, and said bearing comprising:
    an axle sleeve, disposed on said stator, and having an embedded groove extended inward and disposed at an end of said axle sleeve apart from a free end connected to said frame;
    a bearing, being a hollow circular body installed in said axle sleeve, and having a hollow hole groove disposed around said bearing for dividing said hollow hole groove into inner and outer layers, and a connecting portion connected between said inner and outer layers for maintaining an appropriate interval between said inner and outer layers;
    an axle, installed on said rotor, and sheathed into said bearing, and having a groove disposed at the periphery of said axle and corresponding to said connecting portion of said bearing;
    a latch, disposed at an internal side of said rotor, and protruded outward to match with an embedded groove, for latching said stator and said rotor;
    thereby, said embedded groove and said latch engage said stator and said rotor easily, and said groove of said axle corresponds to said connecting portion of said bearing for effectively preventing a deformation of said bearing and a shift of said axle caused by a high temperature produced by the continuous operation of said axle, so as to achieve the effects of reducing noises and enhancing the life expectancy and efficiency of said electric motor.

2. The enhanced thermal deformation resisting bearing of an electric motor of claim 1, wherein said axle sleeve and said bearing are made of a plastic material.

3. The enhanced thermal deformation resisting bearing of an electric motor of claim 1, wherein said embedded groove has an axial slot for providing an elasticity of expanding and contracting said embedded groove.

4. The enhanced thermal deformation resisting bearing of an electric motor of claim 1, wherein said axle sleeve is sheathed securely onto an outer layer of said bearing.

5. The enhanced thermal deformation resisting bearing of an electric motor of claim 1, further having a space between said groove of said axle and said connecting portion of said bearing filled with a lubricant oil for improving the lubricating effect of said axle.

6. The enhanced thermal deformation resisting bearing of an electric motor of claim 1, wherein said bearing is applied to a heat dissipating fan of a computer.

7. An enhanced thermal deformation resisting bearing of an electric motor, said electric motor being comprised of a frame, a stator and a rotor installed in said frame, and said bearing comprising:

- an axle sleeve, disposed on said stator, and having an embedded groove extended inward and disposed at an end of said axle sleeve apart from a free end connected to said frame;
- a bearing, being a hollow circular body disposed at an internal side of said rotor and sheathed into said axle sleeve, and having a hollow hole groove disposed around said bearing for dividing said hollow hole groove into inner and outer layers, and a connecting portion connected between said inner and outer layers for maintaining an appropriate interval between said inner and outer layers;
- an axle, installed in said axle sleeve and sheathed into said bearing, and having a groove disposed at the periphery of said axle and corresponding to said connecting portion of said bearing;
- a latch, disposed at an internal side of said rotor, and protruded outward to match with an embedded groove, for latching said stator and said rotor;

thereby, said embedded groove and said latch engage said stator and said rotor easily, and said groove of said axle corresponds to said connecting portion of said bearing for effectively preventing a deformation of said bearing and a shift of said axle caused by a high temperature produced by the continuous operation of said axle, so as to achieve the effects of reducing noises and enhancing the life expectancy and efficiency of said electric motor.

8. The enhanced thermal deformation resisting bearing of an electric motor of claim 7, wherein said axle sleeve and said bearing are made of a plastic material.

9. The enhanced thermal deformation resisting bearing of an electric motor of claim 7, wherein said embedded groove has an axial slot for providing an elasticity of expanding and contracting said embedded groove.

10. The enhanced thermal deformation resisting bearing of an electric motor of claim 7, wherein axle sleeve is sheathed securely onto an outer layer of said bearing.

11. The enhanced thermal deformation resisting bearing of an electric motor of claim 7, further having a space between said groove of said axle and said connecting portion of said bearing filled with a lubricant oil for improving the lubricating effect of said axle.

12. The enhanced thermal deformation resisting bearing of an electric motor of claim 7, wherein said bearing is applied to a heat dissipating fan of a computer.

* * * * *